Feb. 5, 1963 D. C. LOCKHART 3,076,446
ROTARY INTERNAL COMBUSTION ENGINE
Filed Nov. 4, 1960 3 Sheets-Sheet 3

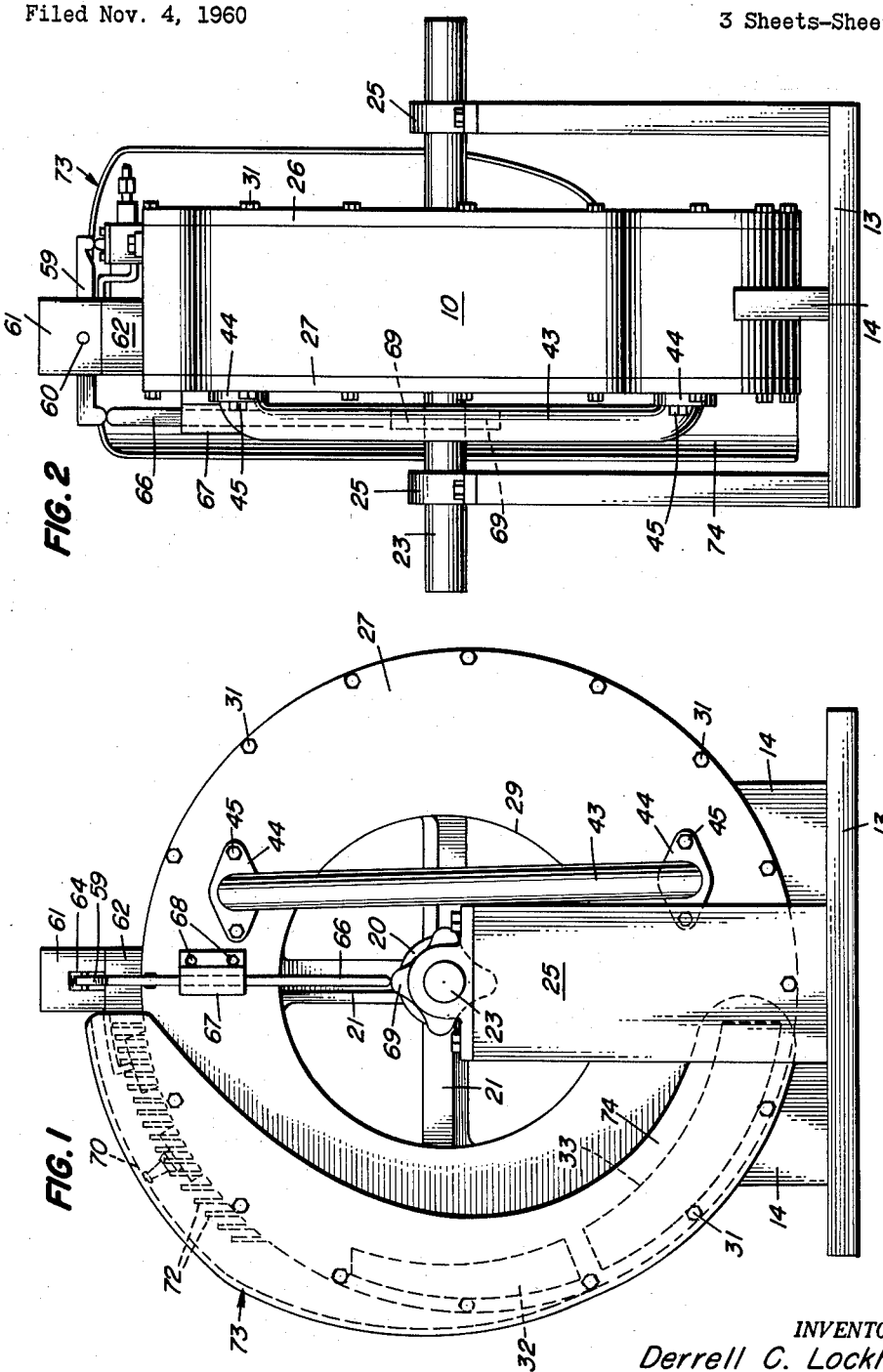
Feb. 5, 1963   D. C. LOCKHART   3,076,446
ROTARY INTERNAL COMBUSTION ENGINE
Filed Nov. 4, 1960   3 Sheets-Sheet 1
INVENTOR.
Derrell C. Lockhart
BY
ATTORNEY

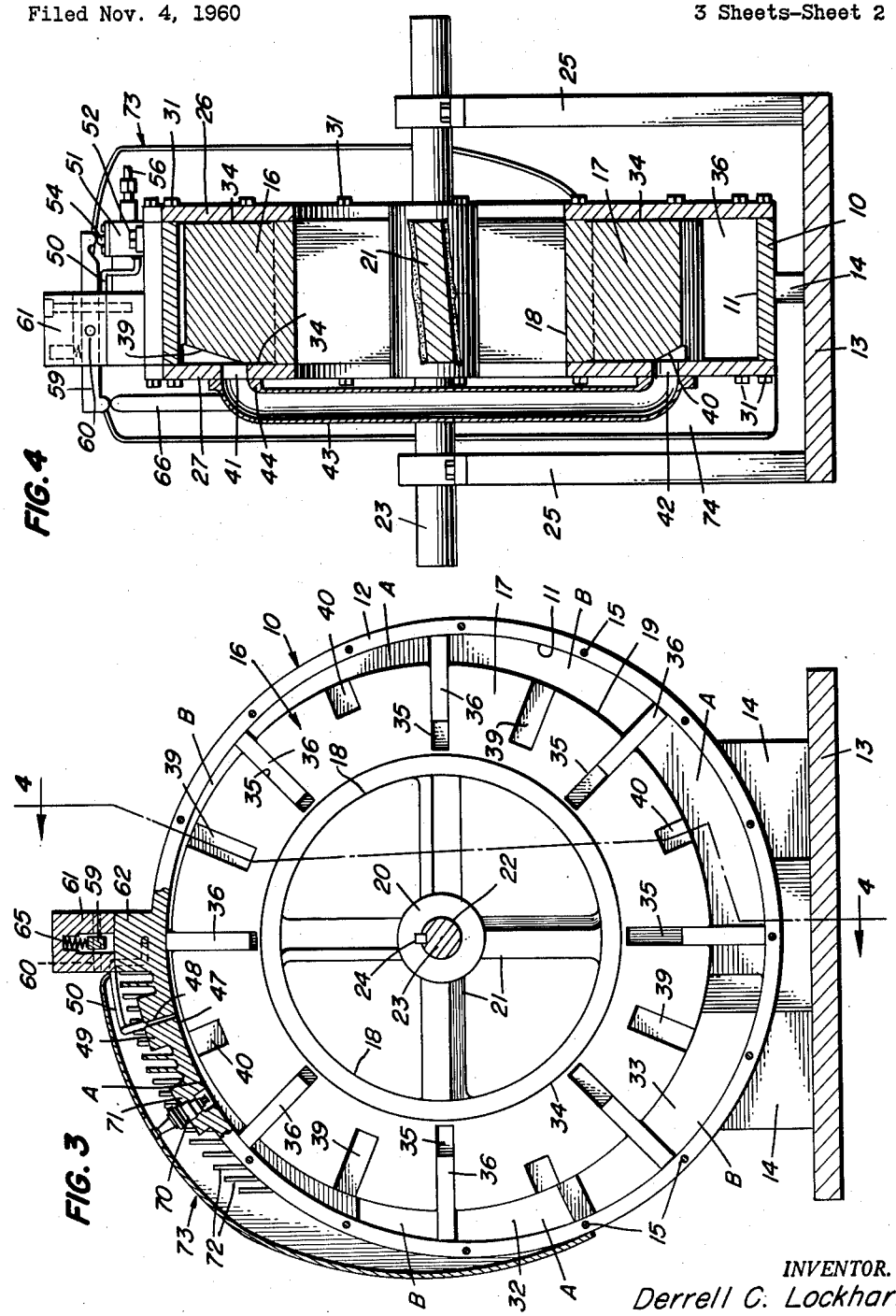

INVENTOR.
Derrell C. Lockhart
BY
ATTORNEY

United States Patent Office 3,076,446
Patented Feb. 5, 1963

3,076,446
ROTARY INTERNAL COMBUSTION ENGINE
Derrell C. Lockhart, Box 312, Newhall, Iowa
Filed Nov. 4, 1960, Ser. No. 67,243
6 Claims. (Cl. 123—16)

This invention relates to a rotary internal combustion engine.

A primary object of the invention is to provide a highly simplified and efficient rotary type engine, designed so that there will be no tendency during the operation of the engine for the fire in the explosion chamber to leak back into the next oncoming combustion chamber and cause pre-ignition of the charge therein.

A further object of the invention is to provide a rotary engine having a plurality of circumferentially spaced alternating combustion and compression chambers, with the latter forming effective insulation between pairs of the combustion chambers, to thereby completely eliminate pre-ignition and a resultant stopping of the engine, caused by leakage of the fire in one combustion chamber back into the next oncoming combustion chamber during the cycle of operation of the engine.

A further important object of the invention is to provide means for effecting a transfer of compressed air in each compression chamber to an oncoming combustion chamber when the former is at or near full compression and the latter is just entering the compression cycle, thereby effecting a much higher compression ratio in each combustion chamber with much less eccentricity of the engine rotor to the stator than is usually required for engines of this type.

A further object of the invention is to provide a rotary engine which may be self-lubricating by utilizing a mixture of lubricating oil and liquid fuel, and an engine having greatly reduced operating friction due to the reduced eccentricity of the rotor relative to the stator, made possible by the novel means for transferring compression from each compression chamber to a corresponding oncoming combustion chamber during the cycle of operation of the engine.

A further object of the invention is to provide in a rotary engine of the above-mentioned character novel and simplified means adapted to serve the dual purpose of cooling the engine and scavenging the same of burnt exhaust gases.

A still further object of the invention is to provide a rotary engine of the above-mentioned character utilizing a positive simplified fuel injection means, timed to automatically inject fuel into each combustion chamber having a compression chamber trailing the same circumferentially during the cycle of operation.

Other objects and advantages of the invention will be apparent during the course of the following detailed description.

Figure 5:
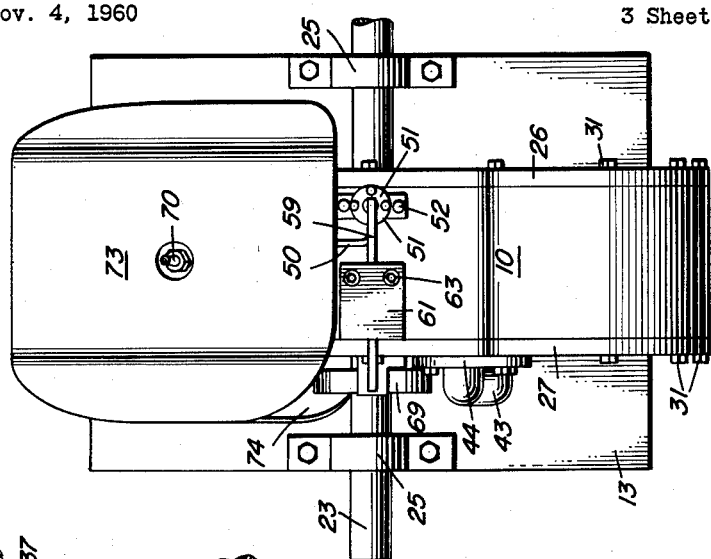
Figure 7:
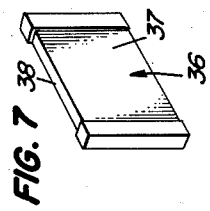
Figure 6:
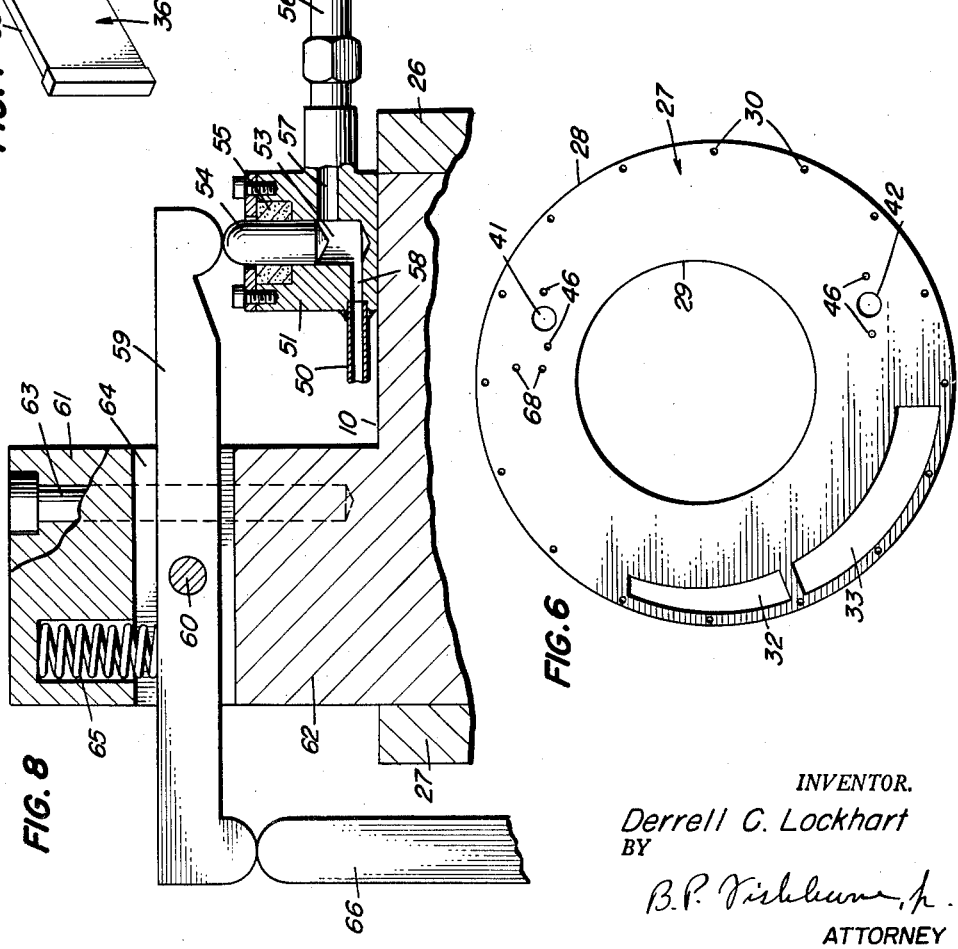
Figure 8:
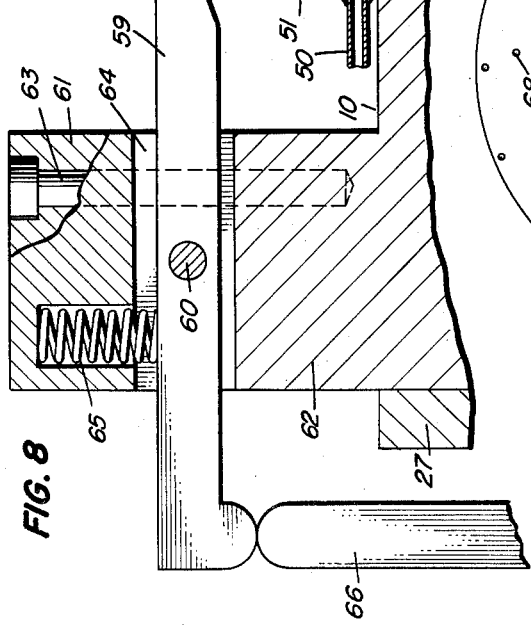

In the accompanying drawings, forming a part of this application, and in which like numerals are employed to designate like parts throughout the same, FIGURE 1 is a side elevation of a rotary internal combustion engine embodying the invention, FIGURE 2 is an edge elevation of the same, FIGURE 3 is a further side elevation of the engine partly in vertical section and with one stator cover plate removed to show the rotor and associated elements, FIGURE 4 is a vertical section taken substantially on line 4—4 of FIGURE 3, FIGURE 5 is a plan view of the engine, FIGURE 6 is a side elevation on a reduced scale of one cover plate for the engine stator, FIGURE 7 is a perspective view of a rotor blade or vane removed, FIGURE 8 is an enlarged fragmentary vertical section showing a cam operated fuel injection pump and associated elements.

In the drawings, wherein for the purpose of illustration is shown a preferred embodiment of the invention, the numeral 10 designates an annular stator ring having an accurately machined bore 11 and accurately machined end faces 12 which are perpendicular to or square with the bore 11. The stator ring 10 in one possible mounting of the engine may be rigidly anchored to a base plate 13 by means of gusset plates 14, welded or otherwise rigidly secured to the stator ring and base plate, as shown. The stator ring 10 is provided in its end faces 12 with a plurality of circumferentially spaced screw-threaded openings 15 to effect the mounting of end cover plates to be described upon the ends of the stator ring.

An annular rotor 16 is provided for disposition eccentrically within the stator ring 10, FIGURE 3, but with a lesser degree of eccentricity than is customarily necessary in rotary engines to provide the required degree of compression for operating the engine efficiently. This reduced eccentricity between the engine rotor and stator results in much lower friction between the rotor vanes to be described and the bore 11 of the stator, as should be obvious.

The rotor 16 embodies an annular body portion 17 having a bore 18 and a concentric periphery 19. The rotor 16 further comprises a central hub 20 rigidly connected with the annular body portion 17 by a plurality of circumferentially spaced radial hubs 21, welded or otherwise rigidly secured to the hub 20 and rotor body portion. As shown particularly in FIGURE 4, the spokes 21 are pitched at an angle to the axis of the rotor 16 so as to produce a fanning action during the operation of the engine to both cool the engine and scavenge exhaust gases in a manner to be further described.

The rotor hub 20 has an accurately machined bore 22 concentric with the rotor periphery and perpendicular to the machined end faces 12 of the stator 10. An engine shaft 23 keyed to the hub 20 at 24 extends axially through the engine and beyond the opposite ends thereof as shown in FIGURES 2 and 4. The shaft 23 is journaled for rotation upon suitable pillow blocks 25 or the like, having their lower ends suitably rigidly secured to the base plate 13 as shown in the drawings. The rotor 16 is thus supported inside of the stator ring 10 by the shaft 23 and with the desired degree of eccentricity. Power produced by the engine may be taken off in any conventional manner, not shown, from the shaft 23, and this shaft may be cranked in any conventional manner for turning the rotor to start the engine.

A pair of substantially identical end cover plates 26 and 27 for the stator ring 10 are provided, the end cover plate 27 being shown in detail in FIGURE 6. These cover plates are circular, and have peripheries 28 to register in assembly with the periphery of the stator ring 10, and eccentric bores 29 for registration in assembly with the rotor bore 18.

Stator cover plates 26 and 27 are provided near their peripheries with a plurality of circumferentially equidistantly spaced openings 30, adapted to register in assembly with the screw-threaded openings 15 of stator ring 10. The end cover plates 26 and 27 are rigidly secured to the end faces 12 of the stator ring by means of cap screws 31 or the like. Each cover plate 26 and 27 is further provided near and inwardly of its periphery and around approximately one-quarter of its circumference with a pair of arcuate exhaust slots 32 and 33, as shown. In assembly, the cover plates 26 and 27 overlie or enclose the opposite end faces of the annular rotor body portion 17, FIGURE 4, and the end faces of the rotor body portion are preferably undercut a small amount at 34, such as from one to two thousandths of an inch to reduce friction between the end faces of the rotor and the stator cover plates.

The rotor 16 is further provided in its annular body portion 17 with a plurality of circumferentially equidistantly spaced radial slots 35, whose number may vary in particular engines, depending upon the size of the engine, the smoothness of operation desired and other variables. For the purpose of illustration only, the rotor 16 is shown provided with eight of the slots 35, and which slots open through the periphery 19 of the rotor and through the end faces thereof and have their inner ends terminating somewhat outwardly of the rotor bore 18, as shown in FIGURE 3.

Disposed slidably in each slot 35 is a rectangular rotor blade or vane 36, having preferably undercut side faces 37 and undercut outer edges 38 to reduce friction between the tips of the vanes 36 and the stator bore 11 and between the side faces of the vanes and the side walls of the rotor slots 35. The vanes 36 may be undercut at 37 and 38 from one to two thousandths of an inch, or the like. The vanes 36 are disposed freely within the rotor slots 35, without springs or the like, and centrifugal force is relied upon entirely during the operation of the engine to maintain the tips of the vanes 36 in sliding contact with the stator bore 11.

As shown in FIGURES 3 and 4, midway between alternate pairs of the slots 35, the rotor body portion 17 is provided in its periphery and in its end face adjacent the cover plate 27 with an inclined notch or recess 39. Similarly, midway between alternate pairs of the slots 35, the rotor body portion is further provided in its periphery and in its same end face with additional inclined recesses or notches 40, and which notches are considerably shorter radially than the notches 39, for a purpose to be explained.

Chambers A which serve as combustion chambers are defined between the two pairs of vanes 36 on opposite sides of each long notch 39, and alternate chambers B serving as compression chambers only are similarly defined between the two pairs of vanes 36 on opposite sides of each short notch 40, see FIGURE 3. The chambers A and B between the vanes 36 are also defined radially by the bore 11 of the stator and the periphery 19 of rotor 16. In the engine embodiment shown, there are four of the combustion chambers A and four compression chambers B arranged alternately therewith, or a total of eight chambers between the pairs of vanes 36 around the periphery of the rotor. It should be understood that the total number of chambers A and B may be varied in practice, depending upon the size of the engine, and it is desired not to limit the invention to a particular number of vanes 36 and chambers defined thereby.

As shown in the drawings, the stator cover plate 27 is provided on opposite sides of the engine axis with a pair of openings 41 and 42, adapted to register momentarily with the long notches 39 and short notches 40 respectively of the rotor during rotation of the latter. The openings 41 and 42 are in constant communication through a generally diametrically extending transfer tube 43, having end flanges 44, rigidly secured at 45 to the outer face of cover plate 27, the latter being provided near the openings 41 and 42 with suitable screw-threaded openings 46 for the attachment of the transfer tube flanges 44. Thus, during rotation of the rotor 16, FIGURE 3, each compression chamber B when conditioned for maximum or near maximum compression at the top of the rotor is momentarily placed in communication with one of the chambers A to subsequently become a combustion chamber, and while such chamber A near the bottom of the rotor is just entering upon the compression cycle as shown in FIGURE 3. This communication between the particular chambers B and A takes place through the respective notches 39 and 40 and through the transfer tube 43 which of course remains stationary with the stator. By virtue of this arrangement, an increased compression ratio and degree of compression is obtained in each chamber A with a lesser degree of eccentricity between the rotor and stator than would ordinarily be required in engines of this type to produce sufficient compression for efficient operation. In effect, during engine operation, each compression chamber B is robbed of compression while at or near the point of maximum compression, in order to boost the degree of compression in one of the chambers A which is just entering upon its compression cycle. Since the chambers B serve as compression chambers only and never as combustion or explosion chambers during engine operation, it does not reduce the engine efficiency to thus rob the chambers B of compression, and, in fact, engine efficiency is greatly increased with a material reduction of engine friction by boosting the compression during the compression cycle, such chambers A subsequently becoming the combustion chambers just past the point of maximum compression, at the beginning of the expansion cycle of the engine. The reduction of engine frictions spoken of is the reduction in friction between the vanes 36 and the stator bore 11 made possible by the lessened eccentricity between the stator and rotor, as previously mentioned.

Means are provided to inject a mixture of fuel and lubricating oil directly into the combustion or explosion chamber A–47, just beyond the point of maximum compression in the engine and at the beginning of the expansion cycle thereof, FIGURE 3. With continued reference to the drawings, this means comprises an injection device or nozzle 48, suitably anchored within a boss 49, formed upon the stator ring 10, FIGURE 3. The injection nozzle 48 is connected by a tube 50 with a pump body 51, rigidly secured at 52 to the top of stator ring 10. The pump body 51 has a main bore 53 receiving slidably a pump plunger 54, sealed therein at 55. A fuel line 56 from a suitable source, not shown, conveys liquid fuel into the pump through a lateral bore 57, communicating with the main bore 53. Suitable one-way closing check valve means, not shown, may be contained within the bore 57 or within the fuel line 56 in a conventional manner. An outlet port 58 leads from the pump bore 53 to the tube 50 connected with the injection nozzle 48.

A rocker arm 59 for actuating the pump plunger 54 is pivoted at 60 upon a block 61, rigidly mounted upon an underlying boss 62, formed integral with stator ring 10. The block 61 is secured rigidly to the boss 62 at 63. The block 61 has a transverse slot 64 formed therethrough for receiving the rocker arm 59, and the latter is suitably spring loaded upon its pivot by a spring 65, as shown in FIGURE 8.

The rocker arm 59 is actuated in the properly timed manner by a reciprocatory link or rod 66, slidably engaging a guide bracket 67, rigidly secured at 68 to the adjacent stator cover plate 27. The upper end of the link 66 directly engages the rocker arm 59 as shown in FIGURE 8. Its lower end, FIGURE 1, engages a four lobed cam 69, secured rigidly to the engine shaft 23, near and outwardly of the cover plate 27.

The four lobes of the cam 69 are equidistantly spaced circumferentially, so as to actuate the rocker arm 59 and the injection pump plunger 54 four times during each revolution of the rotor 16. Consequently, fuel under high pressure will be injected into the explosion chamber 47 four times during a complete rotation of the rotor 16, and the timing is such that the fuel will be injected at the proper instant into each of the chambers A, and no fuel will be injected into the chambers B which serve as compression chambers only, as previously described. Accordingly, each explosion chamber A–47 has a compression chamber B in trailing relation thereto at the moment of ignition or explosion. This trailing compression chamber insulates the explosion chamber A–47 from the next upcoming chamber A to serve as a combustion or explosion chamber. Any leakage of fire from the explosion chamber A–47 back into the compression chamber B trailing it can do no harm and cannot result in pre-ignition with the resulting stopping of the engine.

A spark plug 70 is suitably mounted within another screw-threaded boss 71 formed upon the stator ring 10 in advance of the boss 49 and at the proper location to ignite the charge in the explosion chamber A–47 just beyond the point of fuel injection. Other elements of the ignition system are omitted from the drawings for the purpose of simplification, and it is to be understood that any conventional ignition circuit may be be employed embodying a storage battery, generator, distributor, contact points, etc., properly timed to fire the spark plug 70 at the proper instant. The timing of the ignition system in conjunction with the fuel injection means may be conventional and need not therefore be described in detail herein.

Adjacent the combustion zone of the engine, a multiplicity of generally radial cooling fins 72 are secured by welding or the like to the exterior of stator ring 10, as shown in the drawings. A duct or cowling 73 is secured removably to the engine stator by means of the cap screws 31, FIGURE 1, and this cowling extends over the combustion zone adjacent the fins 72 and around approximately one-half of the circumference of the stator, as shown. Adjacent the cover plate 27 of the stator, the cowling 73 extends over the exhaust slots 32 and 33 in spaced relation thereto as indicated at 74 in FIGURE 1. On the opposite side of the engine adjacent the cover plate 26, the arcuate cowling portion 74 is omitted, FIGURE 4, so that a suitable exhaust pipe, not shown, may be placed in communication with the exhaust slots 32 and 33 of the cover plate 26 to convey the exhaust gases away from the engine.

The pitched spokes 21 of the engine rotor 16 constitute a fan during the operation of the engine, as stated, and the air current produced by the spokes 21 moves axially into the cowling 73 and upwardly adjacent the cover plate 26, FIGURE 4, and over the cooling fin area at the combustion zone of the engine to cool the engine. The air current then passes downwardly inside of the cowling 73 adjacent the cover plate 27 and inwardly of the cowling extension 74. The air current then enters the exhaust slots 32 and 33 of the cover plate 27 and passes through the exhaust zone of the stator axially to purge the engine of exhaust gases. The air and exhaust gases are then discharged through the exhaust slots 32 and 33 of the cover plate 26 and into the exhaust pipe, not shown. Thus, it may now be seen that the fan action of the rotor spokes 21 sets up a flow of air serving the dual purpose of cooling the engine and purging the same of burnt products of combustion in a very efficient manner.

While there has been illustrated in the drawings an engine rotor 16 carrying eight vanes 36 defining a total of eight combustion and compression chambers A and B, it should be understood that there could be a greater or lesser number of rotor vanes and chambers depending upon the size of the rotary engine. The transfer notches 39 and 40 presently shown in FIGURE 4 on one side of the rotor 16 could readily be placed on alternate sides of the rotor if the size of the rotor were such that there was not enough height in the rotor to accommodate all of the notches on the one side thereof. That is to say, the longer notches 39 could be formed in one side of the rotor 16 and the shorter notches 40 could be formed alternately in the opposite side thereof. In this instance, the transfer tube 43 would then be formed to cross over the stator ring 10 to connect the respective compression chambers B with the oncoming chambers A in the early compression stage. The resultant transfer of compression would be carried out in exactly the same manner as shown in the present preferred embodiment and with the same degree of efficiency.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described the invention, I claim:

1. A rotary internal combustion engine comprising an annular stator having air inlet and exhaust gas opening means, an annular rotor disposed within said stator eccentrically, a shaft secured to the rotor and supporting the same and extending axially thereof, stationary bearing means supporting said shaft for rotation, said rotor provided in its periphery with a plurality of circumferentially equidistantly spaced radial slots, radial vanes slidably mounted within said slots of the rotor and having tips slidably engageable with the bore of said stator, said vanes defining between each pair thereof and between the periphery of the rotor and the bore of the stator a plurality of circumferential chambers, alternate ones of said chambers being compression chambers only and the other chambers adapted to serve as combustion chambers during the operation of the engine, said rotor provided in its periphery and in one side face thereof adjacent each compression chamber with a notch, said rotor provided in its periphery and in one side face thereof adjacent each chamber to serve as a combustion chamber with a second notch of lesser length radially than the first-named notch, a transfer tube secured to said stator and having opposite ends positioned for communication in succession with the first-named and second notches during rotation of the rotor, whereby the compressed medium in each compression chamber is transferred through said tube to one of said chambers adapted to serve as a combustion chamber, fuel injection means mounted upon said statior to inject fuel into each combustion chamber only, and ignition means carried by said stator near said fuel injection means to ignite the fuel in each combustion chamber.

2. A rotary internal combustion engine comprising an annular stator, fuel injection and ignition means connected with said stator at one circumferential region thereof adapted to serve as a combustion zone, a vaned rotor mounted within said stator for rotation and defining with the stator a plurality of circumferentially spaced alternately arranged compression chambers and chambers adapted to serve as combustion chambers at said zone, said rotor and stator being eccentrically disposed with said chambers successively smaller toward said zone, said rotor having a plurality of relatively long radial notches adjacent said compression chambers and a plurality of relatively short radial notches adjacent said alternate chambers to serve as combustion chambers, means carried by said stator for placing in momentary communication during rotation of said rotor each long notch with one of said short notches, whereby compression in each small compression chamber is transferred to each large chamber to serve as a combustion chamber, cam means driven by said rotor and actuating the fuel injection means to inject fuel into each combustion chamber only at said zone, said stator having air intake and exhaust openings remote from said zone.

3. A rotary internal combustion engine comprising a stator having an annular bore, fuel injection and ignition means connected in said bore at one circumferential region thereof defining a combustion zone, said stator including side walls having air inlet and exhaust gas openings formed therethrough in a circumferential region beyond said combustion zone, an arcuate cowling secured to said stator and enclosing the exterior of the stator adjacent said zone and adjacent the openings in one side wall of the stator, a vaned rotor mounted eccentrically within said stator for rotation and disposed eccentrically toward said zone and having radial spokes pitched to pump air through said cowling to cool said zone and to scavenge exhaust gases through said exhaust gas openings and to draw air into said air inlet openings, transfer conduit means for said rotor and stator to relieve compression in alternate chambers between vanes of said rotor and to boost compression in the other chambers between vanes of said rotor during rotation of the rotor, and cam means driven by said rotor and actuating the fuel injection means to inject fuel into each chamber having its compression boosted when such chamber is at said zone.

4. A rotary internal combustion engine comprising an annular stator ring, annular side cover plates secured to said stator ring and defining therewith an annular channel-shaped stator passage, an annular rotor body portion disposed eccentrically within said stator passage for rotation therein, a central hub for said rotor body portion, pitched radial spokes interconnecting said hub and rotor body portion and constituting a fan during rotation of the rotor to establish an air current in one axial direction, said side cover plates of the stator having aligned air inlet and exhaust slots formed therethrough in a circumferential region generally opposite to the direction of eccentricity of said rotor, a multiplicity of centrifugal force actuated radial vanes carried by said rotor body portion in circumferentially equidistantly spaced relation and having tips slidably engaging the bore of said stator ring to define therewith and between the stator ring and the rotor body portion a plurality of circumferentially alternating compression chambers and chambers to serve as combustion chambers, said rotor body portion provided in its periphery and in one side thereof with circumferentially spaced alternately arranged radially long and short notches adjacent said compression chambers and chambers to serve as combustion chambers respectively, one side cover plate of the stator having a pair of ports for communication in succession with said long and short notches respectively, a transfer tube connectted with the last-mentioned side cover plate and communicating with said ports, whereby compression is relieved in each compression chamber near the point of maximum compression and boosted in each chamber to serve as a combustion chamber near the point of minimum compression, a fuel injector connected in said stator ring at one circumferential point upon the same near and beyond the point of maximum compression, a spark plug connected in the stator ring near and beyond said fuel injector, a cam operated by said rotor, pump means operated by said cam for supplying fuel to said injector when each chamber to serve as a combustion chamber is adjacent the fuel injector and spark plug, and cowling means extending about said stator adjacent the fuel injector and spark plug and adjacent the air inlet slots, whereby said fan may circulate air through said cowling means to cool the combustion zone of said engine and to scavenge the same of burnt products of combustion and to charge the same with fresh air.

5. A rotary internal combustion engine comprising a stator, a rotor disposed within the stator and supported for rotation therein and having circumferentially spaced radial vanes engageable with the bore of the stator under the influence of centrifugal force, the rotor and stator being eccentrically disposed, the stator having exhaust and air intake opening means remote from the region of maximum compression between the stator and rotor, said vanes and the stator and rotor defining an equal number of circumferentially spaced alternate compression chambers and chambers to serve as combustion chambers, conduit means interconnecting the stator and rotor for transferring compression from the compression chambers near the point of maximum compression to the chambers to serve as combustion chambers near the point of minimum compression, spark plug and fuel injector means mounted upon the stator near and beyond the point of maximum compression and defining a combustion zone between the stator and rotor, a shaft carrying the rotor, a cam secured to said shaft and having circumferentially spaced lobes corresponding in number to the chambers to serve as combustion chambers, a fuel pump associated with the stator, and linkage means interconnecting the cam and fuel pump to actuate the latter for supplying fuel to the injector means when each chamber to serve as a combustion chamber is at said combustion zone.

6. A rotary internal combustion engine according to claim 5, and fan means carried by said rotor to turn therewith, and cowl means mounted upon said stator and extending adjacent said combustion zone and near said exhaust and air intake opening means and receiving air from the fan means to cool said engine and to scavenge the same of exhaust gases.

References Cited in the file of this patent

UNITED STATES PATENTS

| | | |
|---|---|---|
| 1,644,490 | Post | Oct. 4, 1927 |
| 1,790,280 | Nichol | Jan. 27, 1931 |
| 1,847,850 | Reimuller et al. | Mar. 1, 1932 |
| 2,231,440 | Fess | Feb. 11, 1941 |